United States Patent [19]
Fedorenko et al.

[11] 3,732,759
[45] May 15, 1973

[54] PISTON TURNING LATHE

[76] Inventors: Igor Nikolaevich Fedorenko, Zeliev pereulok 34, kv. 1; Fedor Vasilievich Gurin, Kutuzovsky prospekt, 2/1, kv. 187; Vadim Mikhailovich Smelyansky, Mikulsky pereulok, 13, kv. 1; Alexei Vasilievich Voronin, B. Pochtovaya ulitsa, 18/20, korpus 11, kv. 48; Alexei Dmitrievich Kuranov, 1 Kirpichny pereulok, 19, kv. 9, all of Moscow, U.S.S.R.

[22] Filed: Oct. 5, 1971

[21] Appl. No.: 186,721

[52] U.S. Cl. ..................................................82/19
[51] Int. Cl. ..............................................B23b 5/24
[58] Field of Search..............................82/19, 18, 20

[56] References Cited
UNITED STATES PATENTS 3,391,587  7/1968  Van Den Kieboom....................82/19
2,720,806  10/1955  Stewart................................82/18 X

*Primary Examiner*—Leonidas Vlachos

[57] ABSTRACT

A piston-turning lathe comprising a head carrying the work spindle and a tool head provided with cutting tools for preliminary and finish machining of pistons during rotation of the spindle.

The lathe also has a drive for synchronous rotation of the tool head spindle and work head spindle and devices for displacing the work head spindle axis in two mutually perpendicular planes relative to the axis of the tool head spindle, said spindles being installed with a provision for turning their axes in the direction of working feed while the work head spindle is, additionally, installed with a provision for inclining its axis in the same direction, and there is also a means for mutual relative turning of the work head and tool head spindles by the mechanism for setting the tool holders with the cutting tools for preliminary and finish machining.

7 Claims, 16 Drawing Figures

PISTON TURNING LATHE

The present invention relates to the machine-tool building industry and more specifically it relates to lathes for machining the pistons of internal-combustion engines.

Serviceability, reliability and longevity of internal-combustion engines calls for an improvement in the reliability and serviceability of their most vital parts, which include their pistons.

Engine pistons are subjected to the action of both mechanical and thermal loads. Owing to irregular distribution of metal around the circumference of the piston caused by the necessity of providing bosses for the piston pin, the external surface of the piston expands nonuniformly, the greatest expansion taking place along the piston pin axis. In order to make the cross-sectional profile of the piston in the operating condition conform as nearly as possible to a circumference, the cold piston has an oval shape with a smaller axis directed along the piston pin axis. The longitudinal profile of the piston skirt is most often made in a tapered or barrel shape.

Up to the present time the pistons have been machined by grinding or form-turning. However, the form-turning process has a number of inherent disadvantages.

Firstly, this method has low efficiency due to a rigid contact between the feeler rod and the master form, i.e. to the allowable acceleration of the working elements of the machine tools which have a definite mass, so that high machining speeds create considerable forces of inertia which causes the feeler rod to jump away from the master form.

Secondly, the accuracy of the machined surface of the work depends on the surface finish of the master form, its wear, and on the inaccuracies of the machine components which transmit motion from the master form to the cutting tool.

Thirdly, too much labor is required for designing and making master forms, especially the three-dimensional ones and those having a variable cross-sectional profile along the length of the piston.

While form-grinding pistons, the above-listed disadvantages are aggravated by those inherent in grinding, i.e. by heavy cutting forces which distort the piston skirt and impair the accuracy of its cross-sectional shape, and by embedding the abrasive particles into the surface of the piston skirt which is highly objectionable during the operation of the engine.

Besides form-turning lathes there are lathes for turning the piston along an ellipse. Considerably wide application has been found for lathes which turn the pistons with elliptical skirts, said lathes utilize an inclined plane which produces an ellipse in the cylinder cutting operation.

This principle is employed in the lathes described in the following patents:
 No. 665,486, Cl.49a, Group II, 1938, Germany.
 No. 2,121,934, Cl.82-15, 1938, USA.
 No. 2,924,135, Cl.82-19, 1960, USA.
 No. 1,483,369, Cl.B23b, 1966, France.
 No. 1,516,951, Cl.B23b, 1967, France.

The prototype most closely resembling the lathe claimed herein is the piston-turning lathe described in U.S. Pat. No. 2,720,806, 1955.

This lathe incorporates a bed with a table which is movable in a longitudinal direction. A work head with a clamping device for fixing the piston is rigidly fastened to the table. A bridge is mounted on the top of the bed which supports the tool head which is set so that the longitudinal axis of its spindle lies in the vertical plane and passes through the longitudinal axis of the piston being machined with a means for inclination through a small angle (0.5° - 4°) to the piston axis. The path of the cutting tool clamped in the tool holder of the tool head spindle, although it is circular with respect to the axis of the spindle of this head, forms an ellipse, which is projected onto the cross section of the piston. The longitudinal profile of the piston is formed simultaneously with the elliptical cross section by means of a longitudinal master form which moves in the hollow spindle of the tool head in synchrony with the lathe table which carries the work head and the piston.

This lathe is capable of producing only the elliptical cross section. However, the elliptical cross section of the piston can prove optimum only in an individual case since cross-sectional profiles of the pistons vary with engine operation temperatures, with compression ratio, engine power, mass of the pistons and their design features. These factors govern the optimum cross and longitudinal shapes of the piston skirt. As a consequence, each engine must have pistons with definite cross and longitudinal sections, the cross sections of the piston always differing in elliptical shape.

An object of the present invention resides in providing a piston-turning lathe which would produce a range of highly accurate piston profile cross sections, namely elliptical, enveloping an ellipse, enveloped by an ellipse, either constant or variable throughout the length of the piston, and simultaneously producing a tapered or barrel-shaped profile in the longitudinal section of the piston.

This and other objects are achieved by providing a piston-turning lathe comprising a movable table mounted on the lathe bed with a head carrying the work spindle, a tool head installed on a bridge mounted on the lathe bed, said head being fitted with cutting tools for preliminary and finish-machining of pistons during rotation of the spindle which accommodates inside a longitudinal master form contacting the mechanism for setting the tool holders with cutting tools for preliminary and finish machining, and a drive for synchronous motion of the longitudinal master form and the table with the work head. According to the invention, the lathe incorporates a drive for synchronous unidirectional rotation of the tool head spindle and work head spindle, the angular speed of the tool spindle being twice as high as the angular speed of the work spindle, and has means for displacing in two mutually perpendicular planes the axis of the work head spindle relative to the axis of the tool head spindle, these spindles being installed with a means for turning their axes in the direction of working feed while the spindle of the work head is also equipped with a provision for inclining its axis in the same direction, and it also has a means for relative turning of the work head spindle and tool head spindle by the mechanism for setting the tool holders with the cutting tools for preliminary and finish machining of pistons.

Such a design makes it possible to provide a lathe for machining pistons whose cross profiles can be elliptical, enveloping an ellipse and enveloped by an ellipse, either constant or variable along the length of the workpiece, while their longitudinal profiles can be either tapered or barrel-shaped.

It is practicable that said drive for synchronous unidirectional rotation of the tool head spindle and work head spindle should be made in the form of a gear-and-universal-joint drive with a gear transmission to the tool head shaft having a speed ratio of 1:2 and a gear transmission to the work head spindle having a speed ratio of 1:1, both gear transmissions being interconnected by a universal joint drive. This makes it possible to connect kinematically the piston and the tool, ensuring such a relative motion which would produce the preset cross-sectional profile of the piston.

It is also practicable that the axes of the work head and tool head spindles should be relatively displaced in two mutually perpendicular planes by means of screw-and-nut pairs acting in the above-stated planes on the body of the work head.

This enables the setting of the relative positions of the axes of the work and tool head spindles for machining various cross-sectional profiles, namely elliptical, enveloping an ellipse and enveloped by an ellipse.

It is also practicable to turn the axis of the tool head spindle relative to the direction of working feed on the bridge which has a pin on which the tool head is placed in such a manner that the pin axis would pass through the point where the axis of the tool head spindle intersects the plane passing through the tops of the tool head cutters perpendicularly to the spindle axis.

This turning of the tool head spindle axis relative to the direction of working feed ensures the possibility of changing the curvature of the cross profiles enveloping an ellipse or enveloped by an ellipse, i.e. it permits obtaining a range of oval curves at constant values of the larger and smaller axes of the cross profile. Installation of the tool head on the pin so that the axis of said pin passes through the point of intersection of the tool head spindle axis with the plane passing through the tops of the tool head cutters, square to the spindle axis, makes it possible to change the curvature of the profile, i.e. to obtain a range of oval profiles with constant values of the larger and smaller axes of the cross profile without additional setting of the relative positions of the work head and tool head spindle axes.

It is also expedient that, for inclining the axis of the work head spindle in the direction of the working feed in the plane perpendicular to the plane of turning the tool head spindle, the lathe should be provided with a device in the form of a sine table with inclined plates. This makes it possible to produce cross sections of pistons enveloped by an ellipse and varying along the machining length.

It is no less practicable that for turning the axis of the work head spindle in the direction of the working feed in the plane coinciding with and parallel to the plane of turning of the tool head spindle, the lathe should be provided with a swivelling carriage with a hole fitting over the pin secured to the upper plate of the sine table. This ensures elliptical and enveloping an ellipse cross sections of the pistons, variable along their machining length.

It is also expedient that the means for relative turning of the work head spindle and tool head spindle during operation of the mechanism, for setting the holders with the cutting tools, and for preliminary and finish machining should be made in the form of a vane cylinder whose body should carry the gear of the work head gear drive and the body proper should be installed with a provision for turning on the drive shaft, the latter being rigidly connected to the vanes.

The relative turning of the work head spindle and tool head spindle during operation of the mechanism for setting the tool holders with tools for preliminary and finish machining makes it possible to carry out preliminary and finish machining of the workpiece at one setting-up which excludes the errors of basing and clamping which occur if the workpiece is machined on two lathes, and thus ensuring complete machining of the piston skirt on one machine instead of two.

As a result of the present invention, we provide a lathe for machining pistons which ensures a highly accurate range of profiles of piston cross sections: elliptical, enveloping an ellipse, enveloped by an ellipse, either constant or variable throughout the length of the workpiece with simultaneous provision of a tapered or barrel-shaped profile in the longitudinal section of the skirt.

Now the invention will be described in detail by way of example with reference to the accompanying drawings, in which:

FIG. 1 is a side view of the piston-turning lathe according to the invention, partly cut away longitudinally;

FIG. 2 — same, top view, cut out longitudinally;

Figure 1:
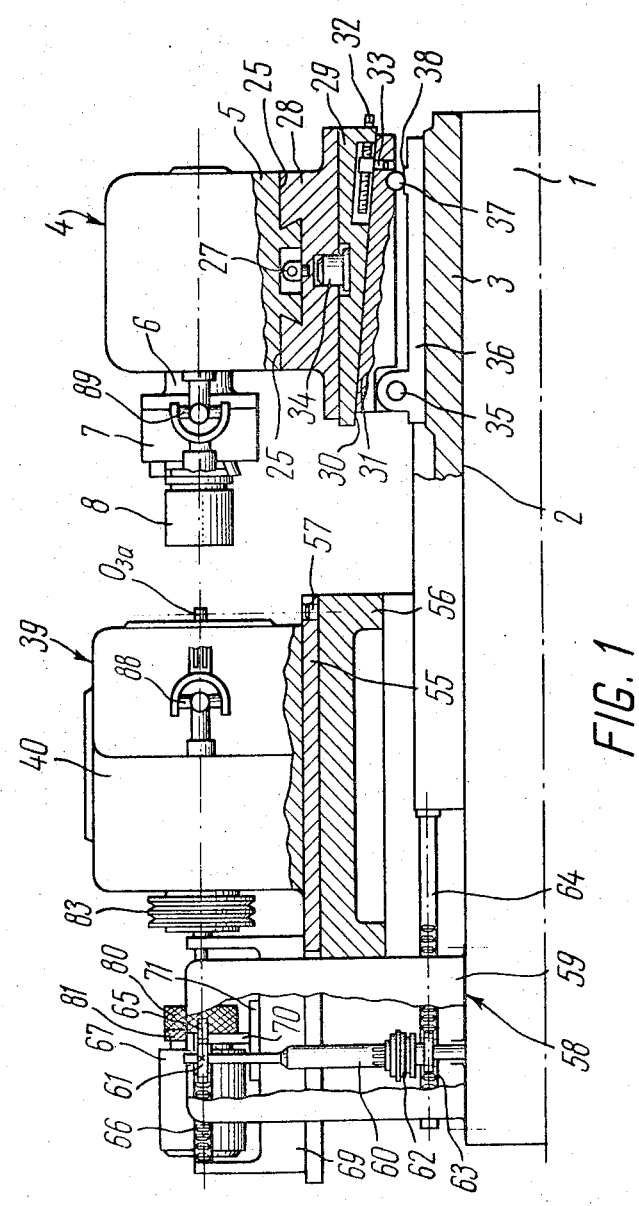

The claimed lathe illustrated in FIGS. 1 through 6 has a bed 1 (FIGS. 1 – 2) of the corresponding size, appropriately secured, and provided with guide surfaces 2 over which the table 3 moves progressively in the direction of $O_1 - O_1$.

The lathe is provided with some means (hydraulic drive) for the uniform feed of the table 3 over the guide surfaces 2 of the bed 1 though these means are not part of the present invention and are not, therefore, shown in the drawings.

The work head 4 is mounted on the lathe table 2 and consists of a body 5 carrying the work spindle 6 installed on bearings, said spindle carrying a chuck 7 for clamping the piston (workpiece) 8.

When the piston 8 is clamped in the chuck 7, the piston axis gets in line with the axis of the spindle 6 so that axis $O_2 - O_2$ will hereinafter be referred to as the piston rotation axis.

Figure 3:
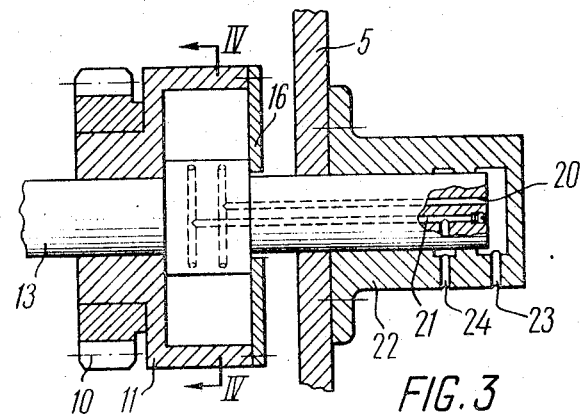
FIG. 3 is fragment A in FIG. 2.

Mounted and fastened on the spindle 6 of the work head 4 is a gear 9 which meshes with the gear 10 rigidly secured on the body 11 of the vane cylinder 12. The speed ratio of the gears 10 and 9 is 1:1. The body 11 of the vane cylinder 12 is rotatably mounted on a drive shaft 13. The vanes 14 (FIG. 4) rigidly secured on the drive shaft 13 at diametrically opposite sides are aligned by the inner cylindrical surface 15 of the body 11 of the vane cylinder 12 and are tightly closed by cover 16 (FIG. 3). Segment stops 17 (FIG. 4) mounted and fastened on the inner cylindrical surface 15 of the vane cylinder body 11 form, together with the vanes 14, working spaces 18 and 19.

The working fluid (compressed air or liquid) is fed into the relevant working spaces through channels 20 and 21 in the drive shaft 13 with the aid of a distributor 22 (FIG. 3) slipped on the end of the drive shaft 12 and fastened to the body 5 of the work head 4.

The distributor 22 has two inlet channels 23 and 24 which supply the working fluid to the relevant spaces 18 or 19 of the vane cylinder 12 during rotation of the drive shaft 13.

When the working fluid is fed through the channel 24 of the distributor 22 and channel 21 of drive shaft 13 to the space 18 of the vane cylinder 12, the vanes 14 together with the drive shaft 13 will turn relatively to the body II of the vane cylinder 12 through an angle limited by the segment stops 17. In the present version of the lathe this angle of turning of the drive shaft 12 with the vanes 14 relative to the body II of the vane cylinder 12 with the gear 10 is equal to 90°.

Figure 4:
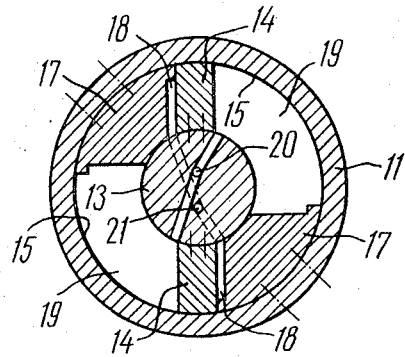
FIG. 4 is a section taken along line IV—IV in FIG. 3.

When the working fluid is fed into the space 19 through the channels 23 and 20, the drive shaft 12 with the vanes 14 returns to the initial position relative to the segment stops 17 as shown in FIG. 4.

The body 5 of the work head 4 is installed on carefully fitted dovetail surfaces 25 (FIG. 1) which allows the body 5 and, consequently, the piston rotation axis $O_2 - O_2$ to be displaced during adjustment in a horizontal plane by means of a screw-and-air pair whose screw 26 (FIG. 2) is installed in the body 5 while a nut 27 (FIG. 1) is fastened in the carriage 28.

Figure 2:
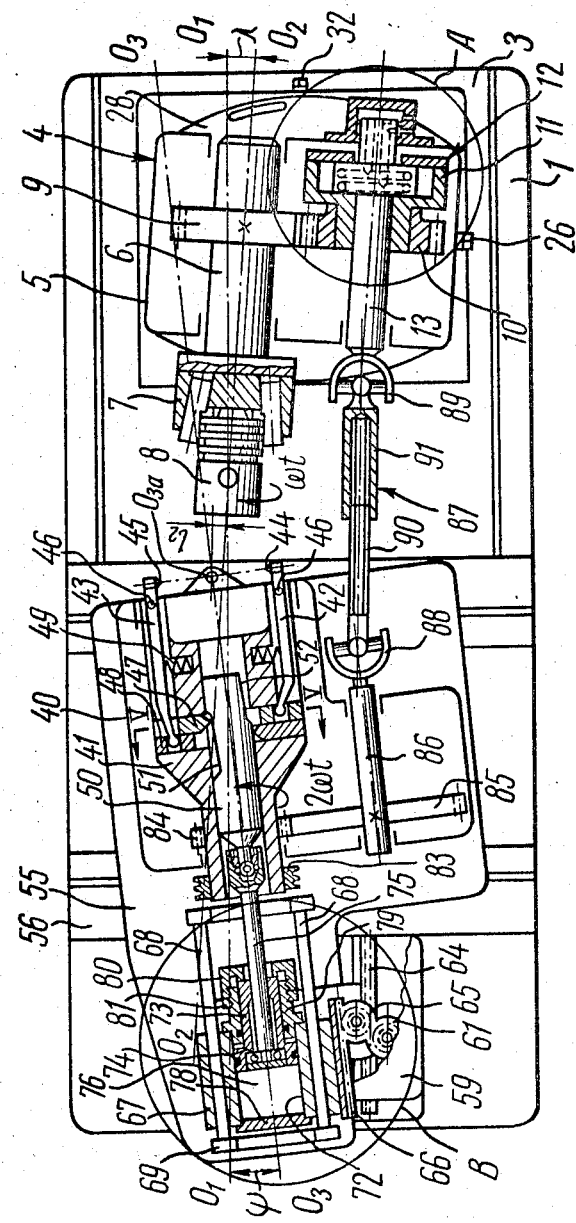

The carriage 28 is secured on the plate 29 whose lower surface 30 is inclined and installed on an inclined surface of a plate 31 which allows a screw-and-nut pair whose screw 32 is set in the plate 29 parallel to the inclined surface 30 and the nut 33 is secured on the inclined surface of the plate 31 to move the piston axis $O_2 - O_2$ in a vertical plane parallel to itself. Besides, the carriage 28 can turn around the pin 34 secured on the plate 29, thus changing the angular position of the piston axis $O_2 - O_2$ in a horizontal plane relative to the direction the table feed $O^1 - O^1$ through angle $\lambda$ (FIG. 2).

A plate 31 is articulated by a pivot 35 (FIG. 1) to a plate 36 secured on the lathe table 3 and is pressed by a cylindrical support 37 against the ground shoulder 38 of the plate 36 thus forming a kind of a sine table which makes it possible to change the angular position of the plate 31 and, consequently, of the piston axis $O_2 - O_2$ in a vertical plane relative to the direction of the table feed $O^1 - O^1$ with the aid of a set of gauge blocks (not shown in the drawings).

The tool head 39 consists of a body 40 in which a hollow spindle 41 is installed on bearings, with the axis of rotation $O_3 - O_3$, said spindle carrying the tool holders 42 and 43 with cutting tools 44 and 45.

Tool holders 42 and 43 are installed in spindle 41 on ball supports 46 and interconnected by sliders 47 and 48 and by spring 49 with the longitudinal profile master form 50.

The master form 50 (FIG. 5) has two forming surfaces 51 and 52 which come in contact with the sliders 47 and 48 in the working position.

The master form 50 with the forming surfaces 51 and 52, the sliders 47 and 48, and the spring 49 constitute a mechanism for setting the tool holders 42 and 43.

The master form 50 is oriented relative to the spindle 41 and sliders 47 and 48 by means of a keyway 53 which receives a key 54 secured to the spindle 41 which allows only an axial movement of the master form 50 in the spindle 41.

The body of the tool head 39 is secured rigidly to plate 55 (FIGS. 1, 2) which, in turn, is located on a bridge 56 with a provision for changing the position of the spindle rotation axis $O_3 - O_3$ through angle $\psi$ by turning around a pin 57 installed on the bridge 56.

The progressive motion of the lathe table 3 and that of the longitudinal profile master form 50 are synchronized by means of a rack-and-gear device 58 consisting of a body 59 secured on the bed 1, said body accommodating a shaft installed on rolling-contact bearings and carrying a rigidly secured gear 61, and electromagnetic coupling 62 with a gear 63. The gear 63 meshes with the gear rack 64 fastened to the table 3, whose motion is imparted to the gear 63; upon energizing electromagnetic coupling 62 rotation is transmitted to the shaft 60 and gear 61.

The gear 61 is connected by an idler gear 65 with a gear rack 66 secured on a carriage 67 which moves over guide bars 68. The guide bars 68 are located on a body 69 rigidly connected with the swivelling plate 55. The idler gear 65 has a sliding fit on the axle 70 which is secured rigidly in the plate 71. The plate 71 is installed on the body 69, ensuring constant mesh of the idler gear 65 with the rack 66.

The idler gear 65 connects the gear 61 with the gear rack 66 when the position of the axis $O_3 - O_3$ of the tool head spindle 41 is changed through a corresponding angle $\psi$.

The carriage 67 has a cylinder 72 which ensures the movement of the piston 73; installed on a bearing 74 in said cylinder 72 is a rod 75 articulated to the longitudinal profile master form 50.

Figure 6:
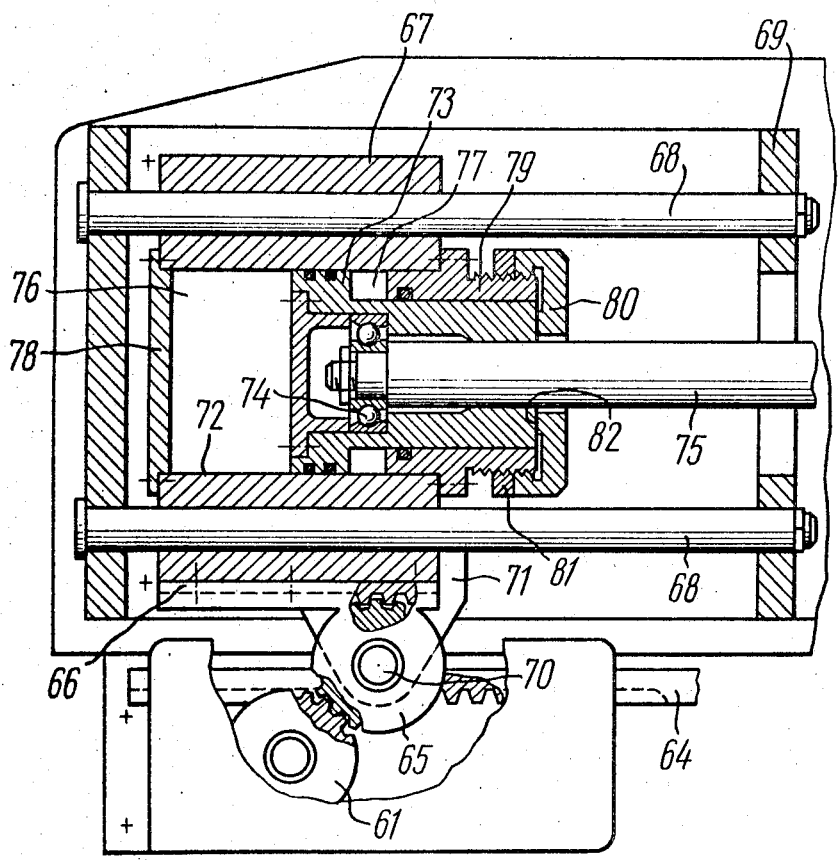
FIG. 6 is fragment B in FIG. 2.

The cylinder 72 has two working spaces 76 and 77 (FIG. 6). The space 76 is formed by the piston 73 and the rear cover 78 while the space 77 is formed by the piston 73 and the front cover 79. The piston stroke is adjusted by a nut 80 and fixed by a lock nut 81.

The preliminary machining of the piston (workpiece) 8 is started with the piston 73 in the forward position when the pressure of the working fluid (compressed air or liquid) fed into the space 76 brings it in contact with the thrust surface 82 of the nut 80.

Rotation of the tool head spindle 41 is transmitted from the electric motor via a V-belt drive (not shown in the drawings) and pulley 83 (FIGS. 1, 2). The spindle 41 carries a gear 84 (FIGS. 1, 2) which is in mesh with the gear 85 mounted on the shaft 86. The speed ratio of the gears is 1:2. Accordingly, the spindle 6 of the work head 4 is rotated by gears 88 and 89, splined shaft 90 and splined bushing 91, drive shaft 13 and gears 10 and 9 in the same direction as the spindle 41 of the tool head 39 but at half the angular speed because the speed ratio of the gears 84 and 85 is 1:2.

In order to obtain the required shape of the piston skirt, the piston (workpiece) 8 is clamped in the chuck 7. Upon starting the lathe, the table 3 together with the work head 4 is fed rapidly by the hydraulic system towards the cutting tools of the spindle of the tool head 39 after which the table 3 is moved at a working feed along axis $O^1 — O^1$.

Concurrently with starting the working feed of the table 3 from the electric motor, rotation is transmitted via the V-belt drive and pulley 83 to the spindle 41 of the tool head 39, while the spindle 6 of the work head 4 is rotated via gears 84 and 85, shaft 86, universal joint drive 87, drive shaft 13 and gears 10 and 9.

But, since the speed ratio of the gears 84 and 85 is equal to 1:2, the tool head spindle 41 rotates at an angular speed 2wt in synchronism with the spindle 6 of the work head 4 whose angular speed is wt.

Synchronization of the progressive movement of the table 3 with that of the longitudinal profile master form 50 is ensured by the rack-and-gear device 58 whose electromagnetic coupling 62 is energized simultaneously with turning on the working feed of the table 3. When the electromagnetic coupling 62 is energized, the progressive motion of the table 3 is transmitted by the rack 64, gear 63, shaft 60, gears 61 and 65 to the rack 66 which is rigidly connected to the carriage 67 so that the latter moves at a speed which is equal to the speed of the working feed of the table 3, but in the opposite direction. The piston 73 is in the forward position (as shown in FIG. 2) in the cylinder of the moving carriage 67 and imparts progressive motion via the rod 75 to the longitudinal profile master form 50 which rotates together with the spindle 41.

Figure 5:
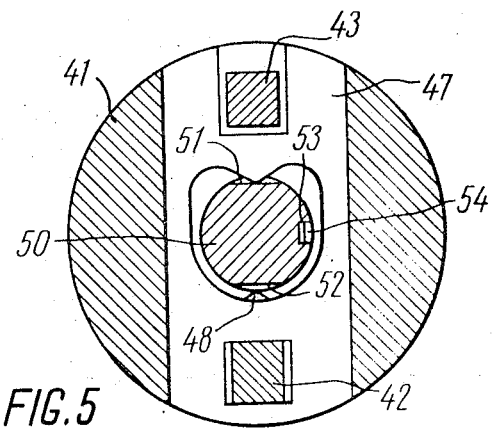
FIG. 5 is a section taken along line V—V in FIG. 2.

The master form 50 has two forming surfaces 51 and 52 in the form of flats; in the position shown in FIGS. 2 and 5 the surface 51 is in contact with the slider 47 which corresponds to the working position of the tool holder 42. At this moment the second slider 48 comes in contact with the rectilinear generatrix of the cylindrical surface of the longitudinal profile master form 50 which corresponds to the nonworking position of the tool holder 43. During axial motion of the master form 50 the cutting tool 44 of the tool holder 42 occupying the working position, moves in accordance with the law set by the forming surface 51 while the cutting tool 45 stays withdrawn from the machined surface because the slider 48 installed in the tool holder 43 is in contact with the rectilinear generatrix of the cylindrical surface of the master form 50.

The use of the master form 50 allows obtaining actually any profile (tapered, barrel-shaped, etc.) in the longitudinal section of the piston 8 because copying is carried out at low speeds which are equal to the speed of the table working feed, the manufacture of the longitudinal profile master forms being quite simple.

At the end of the travel of the table 3 towards the tool head 39, i.e. after preliminary turning of the piston with the cutting tool 44 installed on the tool holder 42, the tool holders 42 and 43 change automatically their positions because the piston 73 in the cylinder of the carriage 67 moves to the rearmost position when the service fluid is fed into the working space 77. Inasmuch as the stroke of the piston 73 is somewhat longer than the length of the workpiece surface being machined, the tool holder 42 is withdrawn, together with the cutting tool 44, from the surface being machined during the longitudinal movement of the master form 50 and occupies a nonworking position while the tool holder 43 carrying a diamond cutting tool 45 for the final machining occupies the working position with the aid of the slider 48 due to transition from the rectilinear generatrix of the cylindrical surface of the master form 50 to the forming surface 52 and due to the force of the spring 49. When the table 3 moves in the opposite direction (from the tool head 39) at the working feed, the carriage 67 with the piston 73 in the rearmost position moves the longitudinal profile master form 50 which, in its turn, moves the slider 48 and, as a consequence, the tool holder 43 with the cutting tool 45, along the profile set by the forming surface 52.

Figure 7:
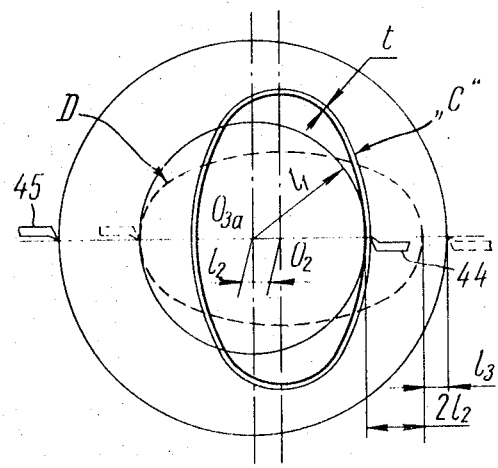
FIG. 7 shows the paths of the cutting tools and the arrangement of the cross-sectional profiles of the piston skirt relative to the axes of the work head and tool head spindles after machining of the piston skirt, with the cutting tools set for preliminary and finish machining.

When the piston (workpiece) 8 is machined in two passes, i.e., by preliminary and finish machining, it must be taken into account that profile "C" (FIG. 7) formed by the cutting tool 44 during preliminary machining proves to be symmetrical with the central point $0_2$ ($0_2$ is the central point of cross sections of the pistons in the normal section of axis $0_2 — 0_2$) so that the finish machining cutting tool 45 should have a radius of rotation with relation to point $0_{3a}$ where the rotation axis $0_3—0_3$ of the spindle 41 of the tool head 39 intersects the plane passing through the top of the cutting tools 44 and 45, perpendicularly to the axis $0_3 — 0_3$, said radius being $2l_2 + l_3$ larger than the radius of rotation of the cutting tool 44 which is equal to $l_1$ where $l_3$ is the value of the required clearance. However, account should also be taken of the cutting depth t of the cutting tool 45 for final machining. Thus, the radius of rotation of the cutting tool 45 around the point $0_{3a}$ should be larger than the radius of rotation of the cutting tool 44 by the value of $R = 2l_2 + t + l_3$ so as not to touch upon the surface being machined.

Upon shifting the tool holders 42 and 43 with the cutting tools 44 and 45 after preliminary machining, i.e., when the tool holder 42 with the cutting tool 44 is withdrawn from the machined surface and the tool holder 43 with the cutting tool 45 is contacted with this surface, the cutting tool 45 will occupy a position diametrically opposite to the cutting tool 44 and will cut the workpiece along the profile "D" (FIG. 7) turned through 90° relative to the profile "C" which has been machined by the cutting tool 44. Therefore, during successive machining with two cutting tools, apart from shifting the tools, i.e. feeding the service fluid into the space 77 of the cylinder 72 of the carriage 67, it is necessary to turn the workpiece 8 through 90° with relation to the final-machining cutting tool 45, i.e. to turn the spindle 6 of the work head 4 with piston 8 relative to the spindle 41 of the tool head 39.

Relative turning of the spindle 6 of the work head 4 and spindle 41 of the tool head 39 will take place when the working fluid is delivered into the spaces 18 of the vane cylinder 12 through channels 24 and 21. This will turn the drive shaft 13 with the vanes 14 relative to the segment stops 17 of the vane cylinder 12. Since the gear 10 is secured on the body 11 of the vane cylinder and meshes with the gear 9 secured on the spindle 6 of the work head 4, and the drive shaft 13 is connected by a gear-and-universal-joint drive with the spindle 41 of the tool head 39, this ensures the required relative turning of the spindles 6 and 41. The body 11 of the vane cylinder 12 is fixed on the drive shaft 13 after each revolution by the elements which are not part of the present invention and are not shown in the drawings.

The service fluid is fed simultaneously into the space 18 of the vane cylinder 12 and into the space 77 of the cylinder 72.

After final turning of the skirt of the piston 8 by the cutting tool 45, rotation of the spindles 41 and 6 is stopped, they are braked, the tool holders 42 and 43 exchange places while the piston 73 moves in the cylinder 72 of the carriage 67 to the initial foremost position, the spindles 41 and 6 turn relative to each other to their initial positions, the electromagnetic coupling 62 is deenergized, the carriage 67 is stopped and the table 3 is rapidly moved to the initial position. The machined piston 8 is withdrawn and the working cycle is repeated over again.

Different profiles of the piston skirt, both constant and varying in length, can be obtained by appropriate settings of the lathe.

The piston profiles which are constant in length can be produced when the workpiece rotation axis $0_2 - 0_2$ is turned relative to the direction $0_1 - 0_1$ of the table feed through an angle of 0° ($\lambda = 0°$) both in the horizontal and vertical planes.

Figure 13:
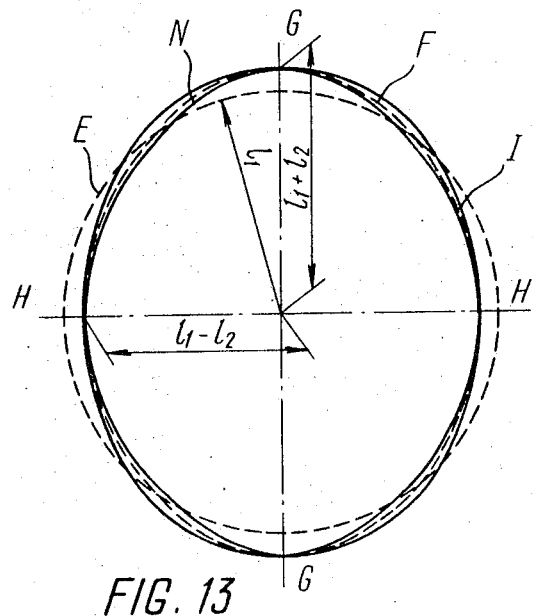
FIGS. 13 – 14 show the cross-sectional profiles of the piston skirts after they have been machined at different settings of the lathe.
Figure 8:
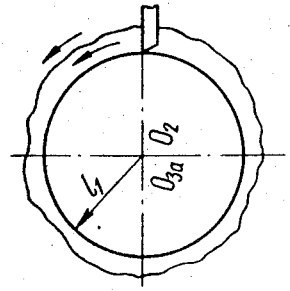
FIGS. 8 through 12 illustrate the arrangements of the spindle axes of the work head and tool head at different settings of the machine and the paths of the cutting tools in the plane perpendicular to the work axis.

When the piston 8 is rotated around the axis $0_2 - 0_2$ such as (in the case of machining profiles that are of constant length and coinciding with the axis of table feed $0_1 - 0_1$) at an angular speed of $wt$ while the cutting tools 44 and 45 whose working radius of rotation is $l_1$ rotate at an angular speed of $2wt$ around the axis $0_3 - 0_3$ which in this case coincides with the axis $0_2 - 0_2$, and the point $0_{3a}$ of intersection of the axis $0_3 - 0_3$ coincides with the plane passing through the tops of the cutting tools perpendicularly to the axis $0_3 - 0_3$ belongs to the axis $0_2 - 0_2$ (as shown in FIG. 8) in the cross section of the piston 8, i.e. in the plane perpendicular to the axis $0_2 - 0_2$, this produces a circumference with a radius $l_1$ (curve $\epsilon$ in FIG. 13).

This is obtained by setting the plate 55 with the tool head 39 (and, consequently, the axis $0_3 - 0_3$) parallel to the direction of table feed $0_1 - 0_1$ with subsequent correction of the position of the piston axis $0_2 - 0_2$ in the vertical plane by the screw-and-nut pair 32, 33, and in the horizontal plane — by the screw-and-nut pair 26 and 27.

Figure 9:
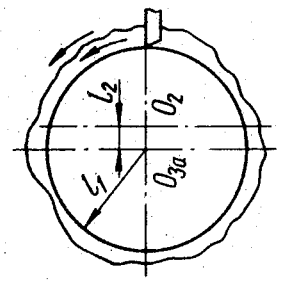

By setting the axis $0_2 - 0_2$ of the piston 8 parallel to the rotation axis $0_3 - 0_3$ of the spindle 4I of the tool head 39 (FIG. 9) and, correspondingly, parallel to the direction $0_1 - 0_1$ of the feed of the table 3, but displacing it by a value of $l_2$ by the screw-and-nut pair 26, 27, we obtain a cross section of the skirt of the piston 8 in the shape of an ellipse with a smaller semiaxis equal to $l_1 - l_2$ and a large one, equal to $l_1 + l_2$ (curve F in FIG. 13).

Figure 10:
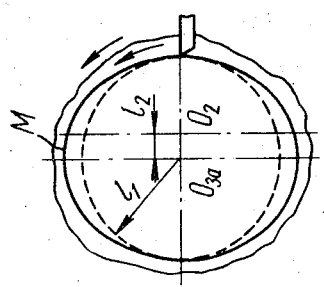

To obtain a curve enveloping an ellipse with semiaxes $l_1 - l_2$ and $l_1 + l_2$ and passing through the points of its larger GG and smaller HH axes (curve I, FIG. 13), i.e. a curve changing the curvature of the profile in each quarter it is necessary, apart from parallel displacement of the piston rotation axis $0_2 - 0_2$ and rotation axis $0_3 - 0_3$ of the tool head spindle 41 through angle $\psi$ in the horizontal plane so that the axis of turning around the pin 57 would pass through the point $0_{3a}$ of intersection of the axis $0_3 - 0_3$ and the plane passing through the tops of the cutting tools 44, 45, perpendicular to the axis $0_3 - 0_3$ and would be located at a distance of $l_2$ from the rotation axis $0_2 - 0_2$ of the piston 8. When the spindle 41 of the tool head 39 is turned through angle $\psi$ the path of the cutting tool in the plane perpendicular to the rotation axis $o_2 - 0_2$ of the piston 8 will be described by ellipse "M" (FIG. 10).

Thus, the ellipse (curve F in FIG. 13) obtained by parallel displacement of the rotation axis $0_2 - 0_2$ of the piston 8 and the rotation axis $0_3 - 0_3$ of the spindle 41 of the tool head 39 is corrected in each quarter by the movement of the cutting tools along the ellipse "M." Depending on the angle of turning $\psi$ of the spindle of the tool head 39 said ellipse makes it possible to produce different curvatures of the cross section of the skirt of the piston 8; in this case the rotation radius of the cutting tool relative to the axis $0_3 - 0_3$ should be $l_1/\cos\psi$.

Figure 11:
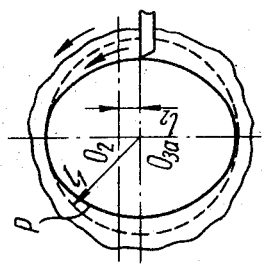

The oval curves enveloped by the ellipse (curve N, FIG. 13) can be obtained if the projection of the cutting tool path (in the plane perpendicular to the axis $0_2 - 0_2$) is described by ellipse "P" shown in FIG. 11, which is achieved by turning the spindle 41 of the tool head 39 through angle $\psi$ in a horizontal plane. However, the radius of rotation of the cutting tools around the axis $0_3 - 0_3$ should in this case be $l_1$ and the rotation axis $0_2 - 0_2$ of the piston is moved in the vertical plane (i.e. in the plane perpendicular to the turning plane of the tool head spindle) by the screw-and-nut pair 32, 33 for a value of $l_2$ relative to the point $0_{3a}$ where the rotation axis $0_3 - 0_3$ of the spindle 41 of the tool head 39 intersects the plane passing through the tops of the cutting tools 44 and 45, perpendicularly to the axis $0_3 - 0_3$.

Figure 12:
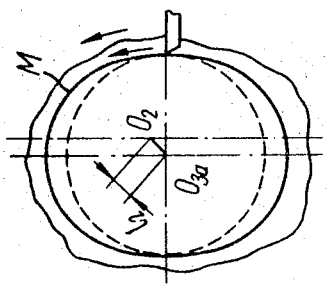
Figure 14:
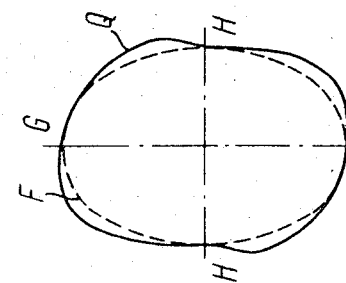

When the rotation axis $0_2 - 0_2$ of the piston 8 is displaced through $l_2$ relative to the point $0_{3a}$ at a certain acute angle to the turning plane of the tool head spindle (FIG. 12), asymmetrical curves can also be obtained. FIG. 14 shows an example of asymmetrical curve Q enveloping the ellipse F.

As a matter of fact, asymmetrical curves are not used in the piston machining practice; however, as much as the pistons are worn more heavily on one side than on the other, such curves probably will become of use in the future.

As a rule, the rotation turning angle $\psi$ of the tool head spindle during machining of pistons from different engine may vary from 0° to 3°30′.

The rotation radius $l_1$ of the cutting tools and the displacement $l_2$ of the axes of the tool head and work head spindles are selected to suit the diameter of the piston. For example, for the piston of 76 mm diameter and a decrease in the profile curve equalling 0.206 mm, $l_2 = 0.0515$ mm and $l_1 = 37.9485$ mm.

The claimed lathe can be used for machining the surfaces of the pistons with the cross sections varying along the length of said pistons. The variable cross sections are characterized in that the larger GG and smaller HH axes (FIG. 15) of the oval curves change through out the length L of the piston surface being machined.

The pistons with a variable cross profile are machined on the claimed lathe at a certain angle in the vertical or horizontal planes of the rotation axis $0_2 - 0_2$ of the piston 8 relative to the direction $0_1 - 0_1$ of the table feed.

When the table 3 with the work head moves in the direction $0_1 - 0_1$ of its feed, with the workpiece rotation axis $0_2 - 0_2$ turned through $\lambda+$, the value of axis displacement $l_2$ relative to the point $0_{3a}$ changes along the length of the work. This value $l_2$ can increase or decrease by a corresponding increment L.tg λ λ (where L= length of piston machining) depending on the side in which the piston rotation axis $O_2 - O_2$ is turned through angle λ.

Angle λ is formed by the piston rotation axis $O_2 - O_2$ and the direction $O_1 - O_1$ of table feed passing through the point $O_2$ where axis $O_2 - O_2$ is crossed by a plane perpendicular to it.

Displacement $l_2$ of axes is increased when, during displacement of the workpiece relative to the point $O_{3a}$, the side of angle λ formed by the direction $O_1 - O_1$ of table feed is located nearer to said point. In case of the contrary arrangement of the sides of angle λ, i.e. when axis $O_2 - O_2$ is located nearer to the point $O_{3a}$, displacement of axes $l_2$ is decreased.

Figure 15:
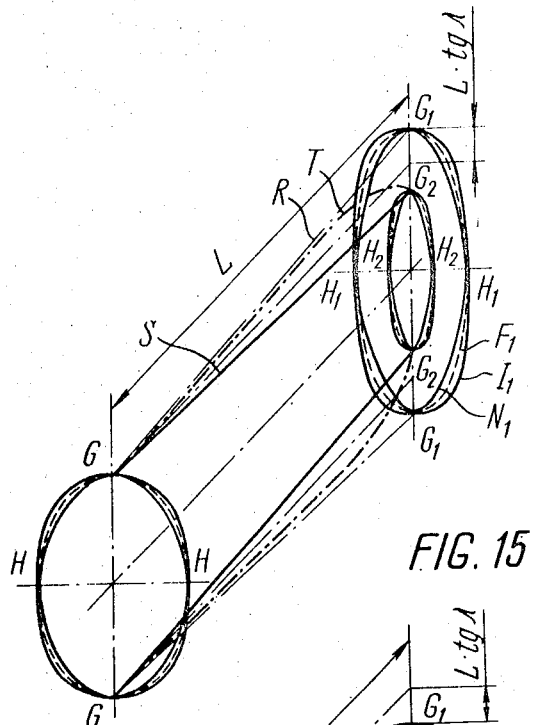
FIGS. 15 – 16 show the nature of the changes in the profile of the piston skirts with the cross sections varying along the piston length at different settings of the lathe.

In the setup shown in FIG. 2, when the table moves towards the tool head, the displacement $l_2$ of axes is increased and the larger semiaxis on the length of machining L at a constant rotation radius $l_1$ of the cutting tools increases by the value Ltgλ whereas the smaller semiaxis decreases by the same value as shown in FIG. 15. Hence, when a longitudinal profile is machined in the plane passing through the larger axes GG and $G_1G_1$ of the cross sections, the master form 50 being disengaged, the generatrix R will be rectilinear and tapered with the larger base $G_1G_1$.

Inasmuch as the maximum cross section diameter of the piston skirt near the piston head (section $G_1G_1 - H_1H_1$ in FIG. 15) must be smaller than near the skirt face end (i.e. GG > $G_1G_1$, an equidistant profile with shorter large and small axes $G_2G_2$ and $H_2H_2$, can be obtained by taking in account the value of λ while profiling the forming surfaces on the longitudinal profile master form 50.

By changing the tool rotation radius $l_1$ on the machining length L with the aid of the master form moving in synchronism with the piston 8, it is possible to obtain a tapered longitudinal profile (generatrix S, FIG. 15) or a barrel-shaped profile (generatrix T, FIG. 15). Such shapes are most characteristic of the pistons with a variable profile.

Figure 16:
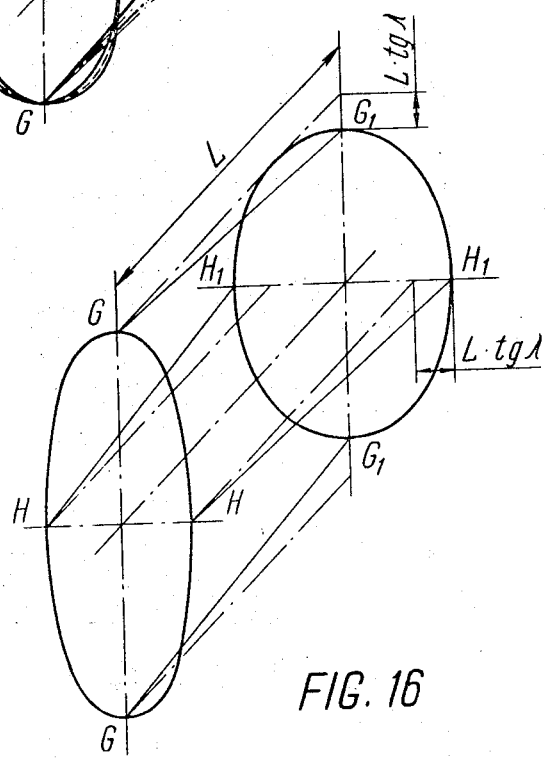

If the axis displacement $l_2$ on the length of machining L is decreased by Ltg λ, the larger semiaxis of the cross section is decreased and the smaller semiaxis is increased (FIG. 16).

The curves of the piston cross sections which are variable in length, i.e. elliptical, enveloping an ellipse and enveloped by an ellipse, can be obtained by using the machine setups similar to those used for obtaining the constant sections along the length of the workpiece shown in FIGS. 8-12, with the sole difference being that the axis $O_2-O_2$ is turned or inclined to a required angle λ.

The elliptical curve which varies along the piston length can be obtained when the spindle 41 of the tool head 39 is turned through angle $\psi = 0°$ and the piston rotation axis $o_2 - O_2$ is displaced through the required angle λ in the horizontal plane (i.e. turning plane of the tool head spindle) to a value of $l_2$ relative to point $O_{3a}$ (curve $F_1$ FIG. 15).

The curves that vary along the piston length and envelop an ellipse can be obtained by turning the axis $O_3 - O_3$ of the spindle 41 of the tool head 39 through a certain angle $\psi \neq 0$ and displacing the piston rotation axis $O_2 - O_2$ turned through angle λ in the horizontal plane (i.e. the plane turning of the tool head spindle) to a value of $l_2$ relative to $O_{3a}$ (curve $J_1$, FIG. 15).

The piston rotation axis $O_2 - O_2$ is turned through angle λ also in the horizontal plane by means of the carriage 28, angularly turning around the pin 34.

When the piston rotation axis turned through angle λ is displaced to a distance of $l_2$ relative to point $O_{3a}$ in the vertical plane (i.e. the plane perpendicular to the turning plane of the tool head spindle) and at an angle $\psi \neq 0$ of turning the tool head spindle axis $O_3-O_3$ we obtain variable cross sections enveloped by an allipse (curve $N_1$ FIG. 15). In this case the piston rotation axis $O_2 - O_2$ is turned through angle λ in the vertical plane around axis 35 with the aid of gauging blocks.

When the piston rotation axis $O_2 - O_2$ is turned through angle λ simultaneously in two planes, this produces variable asymmetrical curves twisted in length (not shown in the drawings).

It follows from the above that the machine permits obtaining a range of oval curves with different degrees of curvature, both symmetrical and asymmetrical, with the same values of the larger and smaller axes and with a constant cross section along the length of the workpiece.

Besides, the machine makes it possible to obtain variable cross sections along the workpiece machining length, these sections being elliptical, enveloping an ellipse and enveloped by an ellipse, as well as asymmetrical curves.

What is claimed is:

1. A piston-turning lathe comprising: a bed; a moveable table mounted on said bed and provided with a head carrying a work spindle; a bridge installed on said bed; a tool head installed on said bridge and provided with a spindle for cutting tools for the preliminary and finish machining of pistons during spindle rotation; a longitudinal master form accommodated inside said tool head spindle and contacting the mechanism for setting the tool holders with said cutting tools for preliminary and finish machining; a means for moving said table along said bed; a means for synchronous unidirectional rotation of said tool head and work head spindles at twice the angular speed of said tool spindle with relation to said work spindle; means for displacing in two mutually perpendicular planes the axis of said work head spindle relative to the axis of said tool head spindle, means for turning the axes of said spindles in the direction of working feed, means for inclining the axis of said work head spindle in the same direction; a means for mutual relative turning of said work head and tool head spindles upon operation of said mechanism for setting the tool holders with the cutting tools for the preliminary and finish machining of the pistons.

2. A lathe according to claim 1 wherein said means for synchronous unidirectional rotation of said tool head and work head spindles is made in the form of a gear-and-universal-joint drive incorporating a gear drive to the shaft of said tool head with a speed ratio of 1:2 and a gear drive to said work head spindle with a speed ratio of 1:1, said drives being connected with a universal-joint drive.

3. A lathe according to claim 1 wherein said devices for displacing the work head spindle axis relative to the tool head spindle axis in two mutually perpendicular planes are made in the form of screw-and-nut pairs which act in these planes on the body of said work head.

4. A lathe according to claim 1 wherein the axis of said tool head spindle is turned relative to the direction of feed by said bridge provided with a pin on which said tool head is installed in such a manner that the axis of said pin passes through the point of intersection of the axis of said tool head spindle with the plane passing through the tops of said cutting tools of the tool head, perpendicularly to the axis of its spindle.

5. A lathe according to claim 1 wherein means for inclining the axis of said work head spindle in the direction of working feed in the plane perpendicular to the plane of turning of said tool head spindle is a device in the form of a sine table with inclined plates.

6. A lathe according to claim 1 wherein means for turning the axis of said work head spindle in the direction of working feed in the plane coinciding with or parallel to the plane of turning said tool head spindle is a swivelling carriage with a hole, said hole being slipped on the pin secured on the upper plate of said sine table.

7. A lathe according to claim 1 wherein the means for mutual relative turning of said work head and tool head spindles by said mechanism for setting the tool holders is made in the form of a vane cylinder whose body carries a gear of the gear drive of said tool head while the body proper is installed with a provision for turning on the drive shaft with which the vanes of said cylinder are rigidly connected.

* * * * *